Oct. 30, 1945.   G. D. CAMPBELL   2,387,880
CONSTRUCTION FOR GLASS MELTING TANKS
Filed June 5, 1942
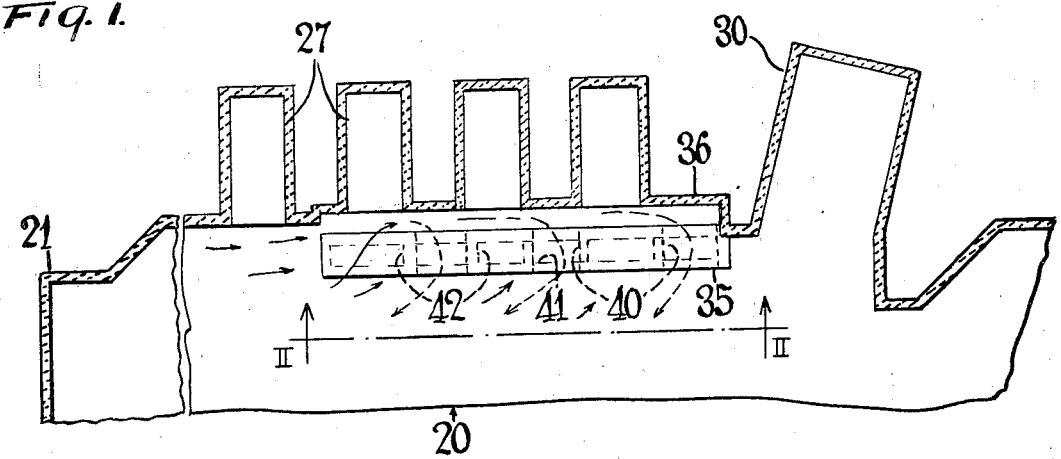
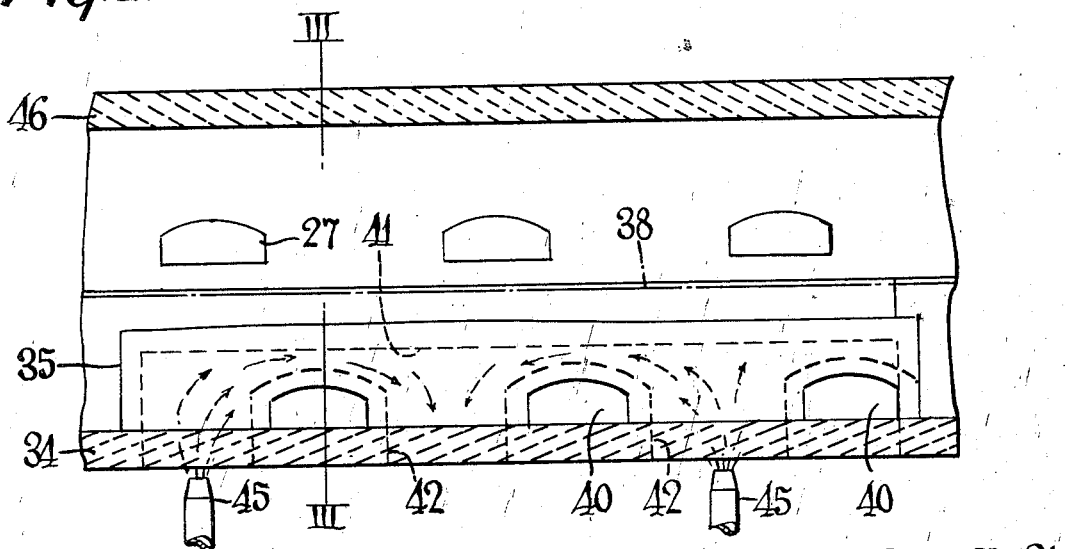
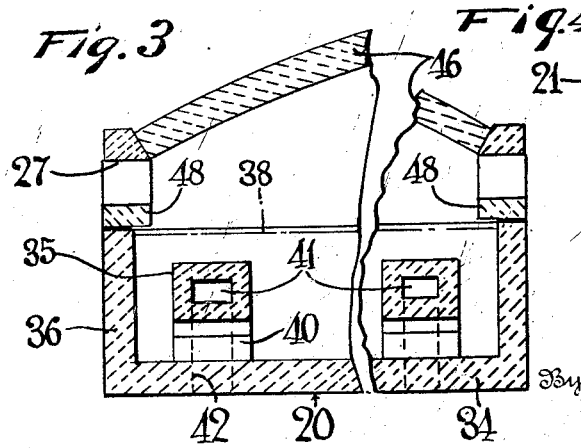
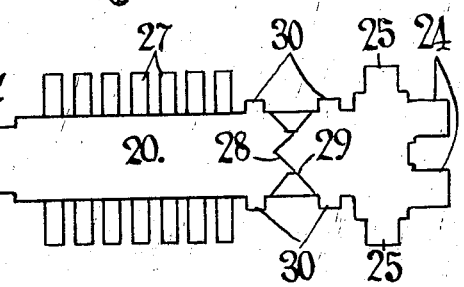
Inventor
GEORGE D. CAMPBELL
By Olen E. Bee
Attorney Patented Oct. 30, 1945

2,387,880

UNITED STATES PATENT OFFICE 2,387,880

CONSTRUCTION FOR GLASS MELTING TANKS

George D. Campbell, Tarentum, Pa., assignor to Pittsburgh Plate Glass Company, Allegheny County, Pa., a corporation of Pennsylvania Application June 5, 1942, Serial No. 445,898

8 Claims. (Cl. 49—54)

This invention relates to the control of molten glass baths and it has particular relation to structural arrangements designed to aid in refining molten glass preparatory to withdrawing it from the bath.

One object of the invention is to provide an improved arrangement of structure in a tank for diverting impurities in a bath of molten glass before they reach glass drawing chambers and returning such impurities for further refinement in the body of the bath.

Another object of the invention is to provide an improved tank for molten glass wherein portions thereof can be controlled as to direction of movement.

In the operation of a glass melting tank or furnace, particularly the type employed in connection with the drawing of window glass, it has been recognized that the better quality of glass passes down the central portion of the tank to the so-called central drawing chambers at the forward end of tank. Certain types of tanks are so constructed that there are one or more drawing chambers at the front central extremity of the tank and at least one drawing chamber at each side of the tank adjacent its front extremity. The glass drawn from the side chambers generally is not as good in quality as that drawn from the front chambers.

The basin of the tank which contains the molten glass bath is composed of refractory blocks and as the body of the bath moves forward toward the drawing end of the tank, the side walls thereof are at least slightly cooler than the inner portion of the bath. Impurities, such as incompletely reacted glass batch, products of erosion along the refractory walls, submerged bubbles, foam, etc., tend to collect and move toward and along the side walls of the tank. Since the tank walls are somewhat cooler than the body of the tank, there is retardation of reaction of the glass ingredients along this area. Solution from the tank basin walls may form in effect a protective shelf for the partially refined glass as it proceeds along the walls where it is shielded from full effect of the heat. Convection currents move from the center of the bath toward the walls, particularly in the upper strata of the bath where poorer quality is more pronounced. Convection currents also move vertically and angularly downward along the side walls as the cooler glass sinks and the warmer upper glass moves in to take its place. This glass contaminated with impurities, including refractory solution, will become involved in eddy currents and will mix with the better quality of glass somewhat close to the walls. It is recognized that the lower portion of the molten glass bath below its surface moves in a reverse direction; that is, back toward the hotter body portion nearer the charging or rear end of the tank.

According to this invention, the characteristics discussed above of the molten glass bath in the tank are taken advantage of in designing tank walls and in adding elements in such manner as to improve the general quality of the glass in the side drawing chambers, as well as in the end drawing chambers, and more completely to control the action of the bath in its tendencies toward movement.

In the drawing:

Fig. 1 is a fragmentary plan of a portion of a glass melting tank or furnace; Fig. 2 is a fragmentary longitudinal section, on a larger scale, taken substantially along the line II—II of Fig. 1 and with roof structure added; Fig. 3 is a fragmentary vertical section taken substantially along the line III—III of Fig. 2; and Fig. 4 is a diagrammatic plan of a glass melting furnace.

In one form of the invention there is provided a glass melting tank 20 adapted to contain a molten glass bath which moves generally from a rear batch-charging end 21 toward a drawing end of the tank where front drawing chambers 24 and side drawing chambers 25 are formed. During the tank operation, the glass ingredients are melted and maintained in molten state by means of flames from suitable fuel fed through side ports 27 along the sides of the tank. In this type of apparatus, known as a regenerative tank, the flames are played over the surface of the bath alternately at proper intervals from opposite sides of the tank. Ordinarily tanks of this type are operated continuously over considerable periods of time.

Before entering the forward portion of the tank, the glass bath passes underneath a conventional refractory floater 28 extending across a narrow channel or neck portion 29 of the tank and resting upon the surface of the bath. This floater is designed to skim off and direct toward the tank sides surface impurities that may collect or form upon the bath. Examples of well known floaters of this type are shown in U. S. Patents 1,661,836, dated March 6, 1928, and 2,042,852, dated June 2, 1936. Skim kilns or compartments 30 on opposite sides of the tank are formed either forward or rearward of the location of the floater. The tank which is elongate supports upon its bottom 34 a fence 35 running adjacent and parallel to each tank side wall 36. Each of these fences is sufficiently spaced from the adjacent side wall 36 to permit molten glass to flow between each wall and fence. The top of the fence is disposed beneath the surface of the bath, the level of which is indicated at 38, and at sufficient depth to permit submerged bubbles or seeds to pass over it. The lower portion of the fence is provided with a series of spaced arched openings 40 extending transversely thereof and through which molten glass can pass. Each fence has a chamber 41 extending substantially from one end portion thereof to the other and communicates at intervals through the bottom of the tank which has openings 42 formed therein for that purpose. These openings 42 communicate with the chamber 41 through the abutments between the arched openings 40. Fluid can be circulated through the openings 42 by means of conduits 45 which are adapted to convey fluid under pressure from a suitable source (not shown).

Conventional roof structure 46 covers the tank basin and the parts of this structure, or junction structure thereof with the side walls, through which the fuel ports 27 are located, extend inwardly to form overhanging corners or shoulders 48 projecting inwardly over the border of the bath (Fig. 3). These shoulders are so positioned that they overhang the portion of the bath between the side walls and the fences 35 and cool the bath slightly at this location. This arrangement promotes the tendency of the upper marginal portions of the bath to sink between the walls and fences and pass through the openings 40, thence back centrally toward the charging end of the tank.

Although only one form of structure has been shown and described in detail, it will be apparent to those skilled in the art that the invention is not so limited, but that various changes can be made therein without departing from the spirit of the invention or from the scope of the appended claims.

What I claim is:

1. In a glass melting tank composed of rigid superstructure and including a molten glass containing basin constructed to maintain molten glass at a predetermined level therein, said basin including side walls extending from a charging end to a discharging end of the tank, refractory structure running substantially longitudinally of the tank adjacent one side wall thereof in inwardly spaced relation to the latter and being supported by said superstructure entirely below the glass level to accommodate circulation of molten glass over the top of said refractory structure, said refractory structure having a lower open portion extending transversely thereof to receive molten glass flowing downwardly from the glass surface and to control circulation of the glass downwardly between the side wall and the refractory structure and through said open portion toward the central portion of the tank.

2. In a glass melting tank composed of rigid superstructure and including a molten glass containing basin constructed to maintain molten glass at a predetermined level therein, said basin including side walls extending from a charging end to a discharging end of the tank, refractory structure running substantially longitudinally of the tank adjacent one side wall thereof in inwardly spaced relation to the latter and being supported by said superstructure entirely below the glass level to accommodate circulation of molten glass over the top of said refractory structure, said refractory structure having a lower open portion extending transversely thereof to receive molten glass flowing downwardly from the glass surface and to control circulation of the glass downwardly between the side wall and the refractory structure and through said open portion toward the central portion of the tank, and a refractory shoulder extending along the upper portion of said side wall and overhanging a marginal portion of the molten glass body to accentuate downward circulation of molten glass toward said open portion.

3. In a glass melting tank composed of rigid superstructure and including a molten glass containing basin constructed to maintain molten glass at a predetermined level therein, said basin including side walls extending from a charging end to a discharging end of the tank, refractory structure running substantially longitudinally of the tank adjacent one side wall thereof in inwardly spaced relation to the latter and being supported by said superstructure entirely below the glass level to accommodate circulation of molten glass over the top of said refractory structure, said refractory structure having a fluid-receiving chambered portion to control the temperature thereof, said refractory structure having a lower open portion extending transversely thereof to receive molten glass flowing downwardly from the glass surface and to control circulation of the glass downwardly between the side wall and the refractory structure and through said open portion toward the central portion of the tank.

4. In a glass melting tank composed of rigid superstructure and including a molten glass containing basin constructed to maintain molten glass at a predetermined level therein, said basin including side walls extending from a charging end to a discharging end of the tank, refractory structure running substantially longitudinally of the tank adjacent one side wall thereof in inwardly spaced relation to the latter and being supported by said superstructure entirely below the glass level to accommodate circulation of molten glass over the top of said refractory structure, said refractory structure having a fluid-receiving chambered portion to control the temperature thereof, the bottom of said basin having openings therethrough communicating with the chambered portion of said refractory structure for circulation of fluid through said refractory structure, said refractory structure having a lower open portion extending transversely thereof to receive molten glass flowing downwardly from the glass surface and to control circulation of the glass downwardly between the side wall and the refractory structure and through said open portion toward the central portion of the tank.

5. In a glass melting tank composed of rigid superstructure and including a molten glass containing basin constructed to maintain molten glass at a predetermined level therein, said basin including side walls extending from a charging end to a discharging end of the tank, refractory structure running substantially longitudinally of the tank adjacent one side wall thereof in inwardly spaced relation to the latter and being supported by said superstructure entirely below the glass level to accommodate circulation of molten glass over the top of said refractory structure, said refractory structure having a fluid-receiving chambered portion, means for circulating fluid through the chambered portion to control the temperature of said refractory structure, said refractory structure having a lower open portion extending transversely thereof to receive molten glass flowing downwardly from the glass surface and to control circulation of the glass downwardly between the side wall and the refractory structure and through said open portion toward the central portion of the tank.

6. In a glass melting tank composed of rigid superstructure and including a molten glass containing basin constructed to maintain molten glass at a predetermined level therein, said basin including side walls extending from a charging end to a discharging end of the tank, a refractory fence running substantially longitudinally of the tank adjacent each side wall thereof in inwardly spaced relation to the latter and being supported by said superstructure entirely below the glass level to accommodate circulation of molten glass over the top of said fence, the refractory fences having openings extending transversely of the lower portions thereof to receive molten glass after flowing of the latter downwardly and to control circulation of the glass downwardly between the side walls and fences and through said openings toward the central portion of the tank.

7. In a glass melting tank composed of rigid superstructure and including a molten glass containing basin constructed to maintain the molten glass at a predetermined level, said basin including side walls extending from a charging end to a discharging end of the tank, refractory structure running lengthwise of the tank adjacent each side wall and supported by said superstructure, said refractory structure including upwardly facing surfaces submerged below the level of the molten glass to accommodate circulation of the latter over the top of said surfaces, said refractory structure having open space between lower portions thereof and the bottom of the tank to receive molten glass flowing over said surfaces and downwardly between the refractory structure and said walls through said space back toward the central portion of the tank.

8. In a glass melting tank composed of rigid superstructure and including a molten glass containing basin constructed to maintain the molten glass at a predetermined level, said basin including side walls extending from a charging end to a discharging end of the tank, refractory structure running lengthwise of the tank adjacent each side wall and supported by said superstructure, said refractory structure including upwardly facing surfaces submerged below the level of the molten glass to accommodate circulation of the latter over the top of said surfaces, said refractory structure also including archways defining transverse open spaces through the lower portions thereof to receive molten glass flowing over said surfaces and downwardly between the refractory structure and said walls through said spaces back toward the central portion of the tank.

GEORGE D. CAMPBELL.